(12) United States Patent
Ramamurthy et al.

(10) Patent No.: US 9,131,251 B2
(45) Date of Patent: Sep. 8, 2015

(54) USE OF A RECEIVE-WINDOW SIZE ADVERTISED BY A CLIENT TO A CONTENT SERVER TO CHANGE A VIDEO STREAM BITRATE STREAMED BY THE CONTENT SERVER

(71) Applicant: Google Technology Holdings LLC, Mountain View, CA (US)

(72) Inventors: Arjun Ramamurthy, San Diego, CA (US); Ajay Luthra, San Diego, CA (US); Mark K. Schmidt, San Diego, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 127 days.

(21) Appl. No.: 13/623,559

(22) Filed: Sep. 20, 2012

(65) Prior Publication Data

US 2014/0082144 A1 Mar. 20, 2014

(51) Int. Cl.
*G06F 15/16* (2006.01)
*H04N 21/2343* (2011.01)
*H04N 21/24* (2011.01)

(52) U.S. Cl.
CPC ..... *H04N 21/23439* (2013.01); *H04N 21/2401* (2013.01); *H04N 21/2402* (2013.01)

(58) Field of Classification Search
USPC .................................. 709/219, 231, 232, 236
See application file for complete search history.

(56) References Cited

U.S. PATENT DOCUMENTS

| | | | |
|---|---|---|---|
| 6,249,530 B1 * | 6/2001 | Blanco et al. | 370/468 |
| 7,779,146 B2 * | 8/2010 | Deshpande | 709/233 |
| 8,040,945 B1 | 10/2011 | Tan et al. | |
| 8,041,656 B2 | 10/2011 | Beck et al. | |
| 2004/0267956 A1 * | 12/2004 | Leon et al. | 709/231 |
| 2008/0186849 A1 * | 8/2008 | Kampmann et al. | 370/232 |
| 2010/0189183 A1 * | 7/2010 | Gu et al. | 375/240.28 |
| 2010/0235472 A1 * | 9/2010 | Sood et al. | 709/219 |
| 2010/0235542 A1 * | 9/2010 | Visharam et al. | 709/246 |
| 2011/0072105 A1 * | 3/2011 | Biderman et al. | 709/217 |
| 2011/0082946 A1 * | 4/2011 | Gopalakrishnan | 709/231 |
| 2012/0311171 A1 * | 12/2012 | Holley et al. | 709/231 |

* cited by examiner

*Primary Examiner* — Brian J Gillis
*Assistant Examiner* — Kamran Mohammadi
(74) *Attorney, Agent, or Firm* — Fenwick & West LLP

(57) ABSTRACT

A method for transmitting video streams from a server to a media device includes selecting by the server first encoding parameters for a first set of video streams based on a first current bandwidth capacity for a network and based on a first current window size of a receive buffer of the media device, and transmitting the first set of video streams from the server to the media device. The method includes selecting by the server second encoding parameters for a second set of video streams based on a second current bandwidth capacity for the network based on a second current window size of the buffer. The first current bandwidth capacity is different from the second current bandwidth capacity or the first window size is different from the second current window size. The method includes transmitting the second set of video streams from the server to the media device.

17 Claims, 3 Drawing Sheets

USE OF A RECEIVE-WINDOW SIZE ADVERTISED BY A CLIENT TO A CONTENT SERVER TO CHANGE A VIDEO STREAM BITRATE STREAMED BY THE CONTENT SERVER

BACKGROUND

Media streaming of media over a network from a content server to a media device has been widely adopted for media consumption. Two network protocols used for media streaming include the user datagram protocol Internet protocol (UDP IP) and the transfer control protocol (TCP) IP. The UDP IP is often used for media streaming for relatively reliable networks, such as in-home streaming over wired connections. The TCP IP is often used for streaming over less reliable networks.

The HTTP based live streaming (HLS) protocol, used with the TCP IP, allows a content server to publish variant playlist files to media devices. A variant playlist file identifies multiple sets video streams for a media program, such as a movie, a television program, etc. where each set of video streams has unique encoding parameters (e.g., bit rates, resolutions, etc.) for the media program. The media devices may dynamically switch between the sets of video streams identified in the variant playlist file as the sets of video streams are transmitted from the content server to the media devices. The media devices may choose to receive an initial set of video streams identified in the variant playlist file based on initial network conditions, initial buffer conditions, etc. For example, the media devices may choose to receive a set of high definition (HD) video streams identified in the variant playlist file if the initial network conditions, the initial buffer conditions, etc. support the streaming of the HD set of video streams. If the initial network conditions degrade, if the initial buffer conditions degrade, etc., then the media devices may choose to receive a set of low definition (LD) video streams identified in the variant playlist file. That is, the media device may dynamically choose different sets of video streams to receive from the content server where the different sets of video streams have different encoding parameters.

Selection and transmission of the sets of video streams are driven by the media devices. In response to a selection of a set of video streams identified in the variant playlist file, the content server passively transmits the set of video streams to the media device. The media device may have limited information about the network conditions and might not select a set of video streams that is suitable for the current network conditions. Further, some types of media devices select the highest resolution and highest bit rate sets of video streams to receive. Typically the content server services multiple media devices, transmitting multiple sets of video streams to the media devices. If a media device requests a set of video streams with high resolution and high bit rate, a large portion of content server resources and/or network bandwidth may have to be allocated in order to service that media device. Consequently, the other media devices serviced by the content server may experience a degraded performance such as intermittent interruptions in the transmission of video streams.

SUMMARY

According to one embodiment, a method for transmitting video streams for a media program from a server to a media device includes selecting by the server first encoding parameters for a first set of video streams for the media program based on a first current bandwidth capacity of a network linking the server and the media device and based on a first current window size of a receive buffer of the media device. The method further includes transmitting the first set of video streams from the server to the media device. The method further includes determining by the server the first current bandwidth capacity change to a second current bandwidth capacity or the first current window size change to a second current window size. The first current bandwidth capacity is different from the second current bandwidth capacity and the first window size is different from the second current window size. The method further includes selecting by the server second encoding parameters for a second set of video streams for the media program based on the second current bandwidth capacity for the network linking the server and the media device or based on a second current window size of the buffer. The method further includes transmitting the second set of video streams from the server to the media device.

According to one embodiment, a method for transmitting sets of video streams for a media program from a server to a set of media devices includes transmitting sets of video streams from the server, respectively, to the set of media devices. Each set of video streams has a set of encoding parameters. The method further includes selecting by the server a different set of encoding parameters for one of the sets of video streams based on a change of a current bandwidth capacity of a data channel between the server and one of the media device or a change of a current window size of a buffer of the one of the media devices. The method further includes transmitting the one of the sets of video streams to the one of the media devices, and thereafter continuing transmitting the sets of video streams from the server, respectively, to a subset of the media devices, wherein the subset of the media devices does not include the one of the media devices.

According to one embodiment, a non-transitory computer-readable storage medium comprises instructions for controlling a server for transmitting a set of video streams to a media device, the instructions for controlling the server to be operable for: selecting by the server first encoding parameters for a first set of video streams for the media program based on a first current bandwidth capacity for a network linking the server and the media device and based on a first current window size of a receive buffer of the media device; transmitting the first set of video streams from the server to the media device; determining by the server the first current bandwidth capacity change to a second current bandwidth capacity or the first current window size change to a second current window size, wherein the first current bandwidth capacity is different from the second current bandwidth capacity and the first window size is different from the second current window size; selecting by the server second encoding parameters for a second set of video streams for the media program based on the second current bandwidth capacity for the network linking the server and the media device or based on the second current window size of the buffer; and transmitting the second set of video streams from the server to the media device.

According to one embodiment, a server for transmitting a set of video streams to a media device includes a set of processors. The server further includes a computer-readable storage medium that includes instructions for controlling the set of processors to be operable for: selecting by the server first encoding parameters for a first set of video streams for the media program based on a first current bandwidth capacity for a network linking the server and the media device and based on a first current window size of a buffer of the media device; transmitting the first set of video streams from the server to the media device; determining by the server the first current bandwidth capacity change to a second current bandwidth capacity or the first current window size change to a second current window size, wherein the first current bandwidth capacity is different from the second current bandwidth capacity and the first window size is different from the second current window size; selecting by the server second encoding parameters for a second set of video streams for the media program based on the second current bandwidth capacity for the network linking the server and the media device or based on the second current window size of the buffer; and transmitting the second set of video streams from the server to the media device.

The following detailed description and accompanying drawings provide a more detailed understanding of the nature and advantages of the present invention.

DETAILED DESCRIPTION

Described herein are techniques for a content server to select sets of video streams having different encoding parameters for transmitting the sets of video streams to a media device. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1:
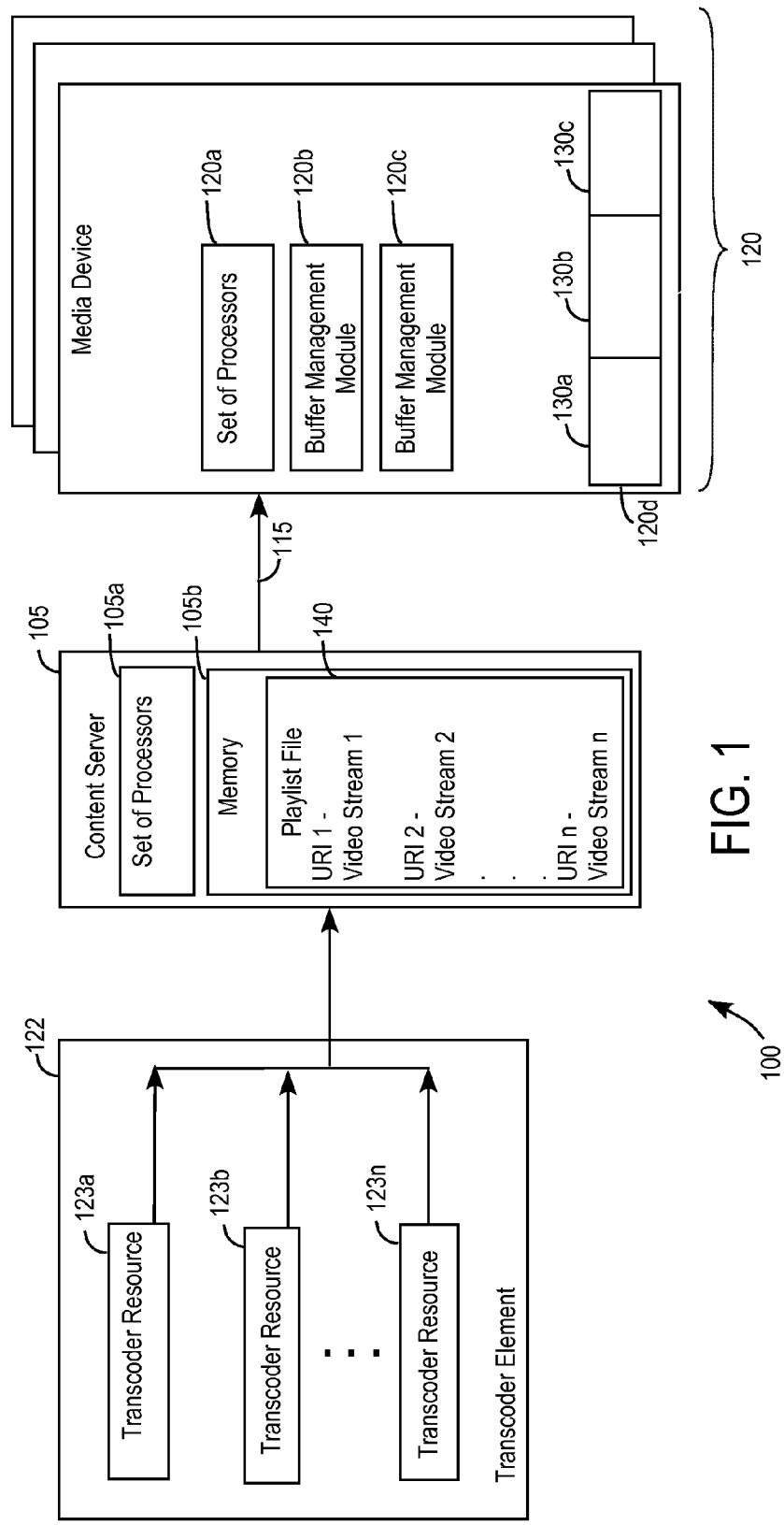
FIG. 1 depicts a video streaming system according to one embodiment.

FIG. 1 depicts a video streaming system 100 according to one embodiment. Video streaming system 100 includes a content server 105, a network 115, a set of media devices 120, and a transcoder element 122. Content server 105 may transmit sets of video streams to media devices 120 via network 115. A set of video streams may be for a media program, such as a movie, a television program etc. Each video stream in a set of video streams may be a short segment of video (e.g., two second, ten seconds, etc.). A set of video streams my include thousands of video streams for a media program, such as a two hour movie. The sets of video streams may be provided to content server 105 from transcoder element 122. Transcoder element 122 may include a number of transcoder resources 123 where each transcoder resource may provide a set of video streams having unique encoding parameters (e.g., a bit rate, a resolution, etc.). Network 115 may include the Internet, various intranets, etc. Network 115 may include wired links and wireless links. It will be understood that the various references made herein to "media" and "video" include both video content and audio content.

Content server 105 may include a set of processors 105a and a non-transitory computer readable storage medium (memory) 105b. Memory 105b may store instructions, which the set of processors 105a may execute to carry out various embodiments described herein. Content server 105 may include a number of computer devices that share a domain.

Each media device 120 may include a set of processors 120a and a non-transitory computer readable storage medium (memory) 120b. Memory 120b may store instructions, which the set of processors 120a may execute to carry out various embodiments described herein.

Media device 120 may also include a buffer management module 120c and a receive buffer 120d. Receive buffer 120d receives video packets for a set of video streams that is transmitted from content server 105 to media device 120 for a media program. The video packets may be retrieved by the set of processors 120a from receiver buffer 120d as media device 120 consumes the video packets.

In some embodiments, receive buffer 120d includes three buffer sections 130a, 130b, and 130c. First buffer section 130a may be for video packets that media device 120 has received from content server 105 but has not consumed for media play. Media device 120 may have acknowledged receipt of the video packets in first buffer section 130a to content server 105 via an acknowledgment. Buffer management module 120c may monitor the rate at which video packets in first buffer section 130a are retrieved for consumption by media device 120.

Second buffer section 130b may be for video packets that media device 120 has received from content server 105 but has not consumed for media play. Media device 120 may not have sent acknowledgments to content server 105 for the video packets in second buffer section 130b. Portions of second buffer section 130b may be categorized as portion of first buffer section 130a as acknowledgments for video packets in second buffer section 130b are transmitted to content server 105 from media device 120. Buffer management module 120c may track the portions of second buffer section 130b that are categorized as a portion of first video buffer 130a when media device 120 sends an acknowledgment to content server 105 for acknowledging receipt of the video packets in second buffer section 130b.

Third buffer section 130c may be available for receipt of video packets. Buffer management module 120c may monitor third buffer section 130c to determine when third buffer section 130c receives video packets and is categorized as a portion of second buffer section 130b. Portions of first buffer section 130a may be categorized as a portion of third buffer section 130c as video packets from first buffer section 130a are consumed. That is, the portion of first buffer section 130a for which video packets are consumed, may receive new video packets from content server 105.

The sizes of first, second, and third buffer sections 130a-130c together define the maximum buffer size for video packet buffering according to one embodiment. The maximum buffer size may be allocated by media device 120 when opening an initial connection with content server 105. The maximum buffer size typically remains unchanged after the allocation.

The sizes of first, second, and third buffer sections 130a-130c may vary relative to each other as video packets are received and consumed by media device 120. As described briefly above, the size of first buffer section 130a may vary depending on the rate at which the set of processors 105a retrieves video packets from first buffer section 130a. Variation of the size of the first buffer section 130a affects the sizes of second and third buffer sections 130b and 130c. For example, if media device 120 retrieves video packets from first buffer section 130a at a relatively high rate, first buffer section 130a may be relatively small, and second and third buffer sections 130b and 130c may be relatively large as a result. Alternatively, if media device 120 retrieves video packets from first buffer section 130a at a relatively low rate, first buffer section 130a may be relatively large, and second and third buffer sections 130b and 130c may be relatively small as a result.

The combined size of second and third buffer sections 130b and 130c defines a "current window size." According to one embodiment, media device 120 transmits the current window size to content server 105 in each communication (e.g., acknowledgment, request, etc.) that media device 120 sends to content server 105. The current window size informs content server 105 of the maximum number of video packets (e.g., TCP IP packets) that content server 105 may transmit to media device 120 before media device transmits another communication (e.g., an acknowledgment) to content server 105. According to one embodiment, the current window size is transmitted in a header of each communication packet (e.g., TCP IP packet) sent from media device 120 to content server 105. In an initial communication transmitted by media device 120 to content server 105, media device 120 may transmit an initial current window size, and in subsequent communications may transmit updated current window sizes when the current window size changes from the initial current window size. Content server 105 may store and track the current window size of media device 120.

According to a further embodiment, content server 105 may estimate a current bandwidth capacity of network links of network 115 linking content server 105 and media device 120. Content server 105 may determine current bandwidth capacity via a variety of methods. According to one specific embodiment, content server 105 determines the amount of time it takes for the media device 120 to respond to each transmission that content server 105 sends to media device 120. Specifically, media device 120 may transmit an acknowledgment for each transmission received from content server 105. Content server 105 may determine a round trip time from the time of transmission and to the time of receiving an acknowledgement. Based on the round trip time and how much data was transmitted, content server 105 may estimate the current bandwidth capacity between content server 105 and media device 120. Content server 105 may use additional information for estimating the current bandwidth capacity, such as the transmission bandwidth of content server 105.

Content server 105 may generate a number of playlist files 140 for the sets video streams that may be provided by transcoder resources 123. Each playlist file 140 may include uniform resource identifiers (URIs) for the video streams generated by transcoder resource 123. Each playlist file 140 is for a set of video streams having unique encoding parameters (e.g., bit rate, resolution, etc.) according to one embodiment. The encoding parameters for resolution may include QVGA, HVGA, VGA, 480p30, and 720p30 resolutions. The encoding parameters for bitrate may be from 200 Kbps to 5 Mbps, for example. For example, a first playlist file 140 may be for a first set of video streams for a media program having encoding parameters of 480p30 resolution and a 3 Mbps bit rate, a second playlist file 140 may be for a second set of video streams for the media program having 720p30 resolution and a 3 Mbps bit rate, a third playlist file 140 may be for a third set of video streams for the media program having 720p30 resolution and a 5 Mbps bit rate, etc.

While content server 105 provides a set of video streams for a media program to media device 120, content server 105 may change the particular set of video streams that content server 105 transmits to media device 120 where the two sets of video streams may have different encoding parameters (e.g., resolutions, bit rates, etc.). For example, as content server 105 provides a set of video streams for a media program to media device 120, content server 105 may change the particular set of video streams transmitted to media device 120 to change the resolution and the bit rates of the set of video streams to adjust to changes in the current window size of receive buffer 120d and/or the current bandwidth capacity of networks links linking content server 105 and media device 120.

According to one embodiment, if the current bandwidth capacity between content server 105 and media device 120 is reduced, content server 105 may switch from transmitting high bit rate (e.g., 3 Mbps rate) video streams to transmitting lower bit rate (e.g., 500 Kbps) video streams to accommodate the reduced current bandwidth capacity. Content server 105 may also switch from transmitting a high resolution (e.g., 780p30) set of video streams to transmitting a lower resolution (e.g., VGA) set of video streams. Conversely, if the current bandwidth capacity between content server 105 and media device 120 increases, content server 105 may switch from transmitting a low bit rate (e.g., 5 Kbps rate) set of video streams to transmitting a higher bit rate (e.g., 2 Mbps) set of video streams to accommodate the increased current bandwidth capacity. Content server 105 may also switch from transmitting a low resolution (e.g., VGA) set of video streams to transmitting a higher resolution (e.g., 720p30) set of video streams.

According to another embodiment, if the current window size for receive buffer 120d is lowered by media device 120 as media device 120 receives a set of video streams for a media program, content server 105 may switch from transmitting a high bit rate (e.g., 3 Mbps rate) set of video streams to transmitting a lower bit rate (e.g., 500 Kbps) set of video streams to accommodate the reduced current window size. On the other hand, if the current window size for receive buffer 120d is increased by media device 120 as media device 120 receives a set of video stream, content server 105 may switch from transmitting a low resolution set of video streams to transmitting a higher resolution set of video streams to accommodate the increased current bandwidth capacity. Content server 105 may similarly switch from transmitting high or low resolution sets of video streams to transmitting lower or higher resolution sets of video streams, respectively, to adjust to reduced or increased current window sizes. Content server 105 may change the set of video streams transmitted to media device 120 at packet boundaries, key frame boundaries, or other locations in the media program where a change in the set of video streams is least likely to be noticed by a user.

In accordance with the present disclosure, the set of video streams by content server 105 for transmission may have encoding parameters that are determined based on the current bandwidth capacity and the current window size according to one embodiment. Thereby, media device 120 may consume a set of video streams that are delivered at a resolution, bit rate, etc. that are suited for the current bandwidth capacity and the current window size. According to an alternative embodiment, the encoding parameters may be set to a level lower than is permitted by the current bandwidth capacity and the current window size. This provides some headroom, allowing for the current bandwidth capacity and the current window size to lower, yet still ensure that the transmission of the set of video streams continues without unexpected degradation, pauses, dropped video packets, etc.

According to one embodiment, content server 105 may dynamically request that the set of video streams provided to content server 105 from transcoder element 122 have the encoding parameters determined by content server 105. According to one embodiment, content server 105 may dedicate one transcoder resource 123 included in transcoder element 122 to media device 120. The dedicated transcoder resource 123 may then provide the set of video streams to content server 105 for subsequent transmission to media device 120.

Content server 105 may generate a playlist file 140 for the set of video streams for transmission to media device 120. If content server 105 determines that a different set of video files having different encoding parameters are to be transmitted to media device 120, content server may generate a new playlist file 140 for the different set of video files. Different playlist files 140 may include different lists of URIs for different set of video streams for the media program. The video streams identified in one playlist file 140 have the same encoding parameters (resolution, bit rate, etc.). Content server 105 may include playlist file 140 in each transmission that content server 105 transmits to media device 120. If the current bandwidth capacity from content server 105 to media device 120 changes and/or if the current window size of receive buffer 120d changes, content server 105 may determine a different set of video streams to transmit to media device 120 based on the changes. The different set of video streams have different encoding parameters (e.g., higher or lower resolution, higher or lower bit rate, etc.), which may be better suited for the changes to the current bandwidth capacity and/or if the changes to the current window size. Content server 105 may request that the transcoder element 122 provides the different set of video streams to content server 105. Content server 105 may transmit a different playlist file 140 for the different set of video streams to media device 120 so that media device 120 may retrieve the different video streams.

In some embodiments, each media device in the set of media devices 120 may be prohibited from selecting encoding parameters it downloads. This prevents any one media device from selecting encoding parameters that could consume network bandwidth and content server resources to the detriment of the other media devices. Instead, content server 105 may control the sets of video streams that each media device 120 receives. The content server 105 may also perform load balancing based on current bandwidth capacities for all of the media devices 120, and may load balance based on the current buffer windows of all of the media devices 120 where each media device might not know the current buffer windows of other media devices 120.

According to one embodiment, content server 105 may track the current bandwidth capacities and/or the current window sizes of a number of media devices 120. Content server 105 may determine a playlist file to transmit to each media device 120 based on the current bandwidth capacity and/or the current window size for the media device. Content server 105 may dedicate one transcoder resource 123 to the number of media devices 120, where transcoder resource 123 may provide a number (e.g., five, ten, fifteen, etc.) of sets of video streams having different encoder parameters.

According to one embodiment, content server 105 may dynamically change the temporal lengths of the video streams transmitted to media device 120 based on the current bandwidth capacity, the current window size, or other information. For example, content server 105 may create and transmit initial playlist file 140 that includes URIs for ten second video streams, and may thereafter generate and transmit a subsequent playlist file 140 that includes URIs for three second video streams based on the current bandwidth capacities and/or the current window sizes to provide optimal transmission of the set of video streams to media device 120. As described above, content server 105 may generate and transmit the subsequent playlist file 140 dynamically as a set of video streams is transmitted and as conditions change for the current bandwidth capacity and/or the current window size. Dynamic changes to playlist files 140 may include changes the temporal lengths of the video streams. For example, the initial playlist file may include an initial number identifiers for first set of video streams that are each ten seconds in length, and the subsequent playlist file may include a larger number of identifiers for a second set of video stream that are each three seconds in lengths.

Figure 2:
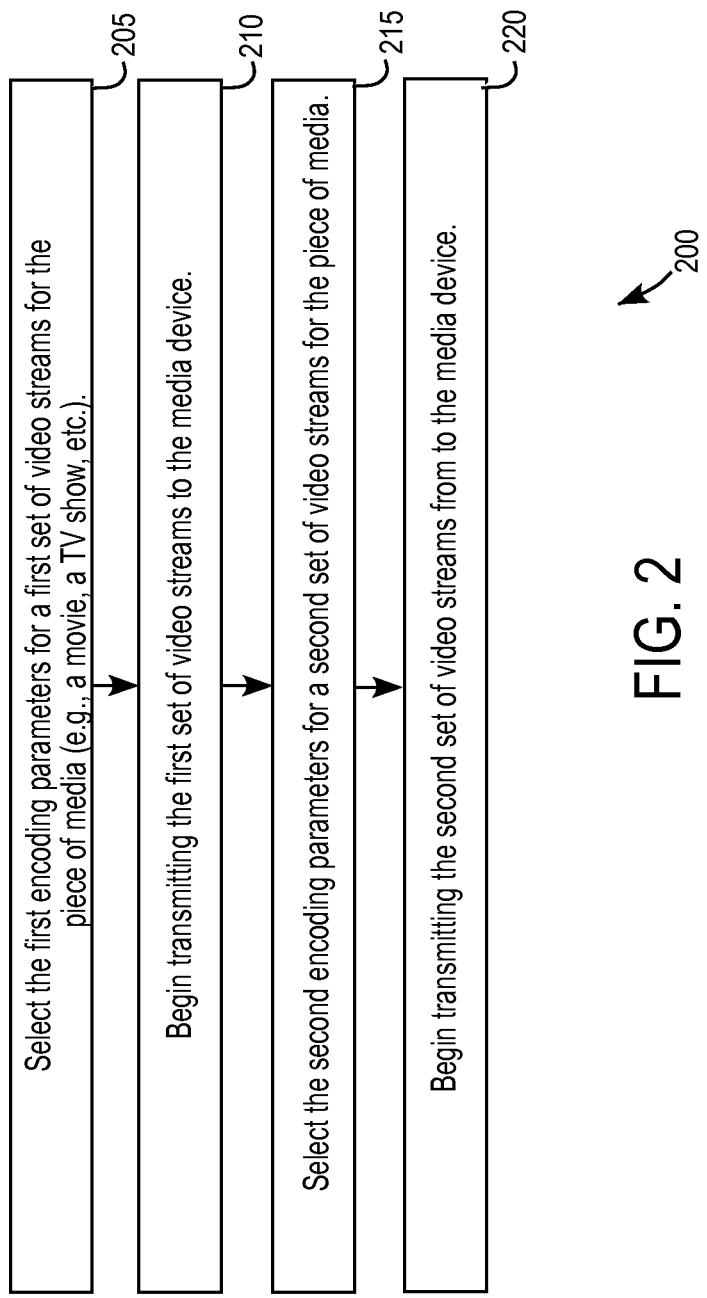
FIG. 2 depicts a high-level flow diagram of a method for transmitting sets of video streams for a media program from a content server to a media device according to one embodiment.

FIG. 2 depicts a high-level flow diagram of a method 200 for transmitting sets of video streams for a media program from content server 105 to media device 120 according to one embodiment. The high-level flow diagram represents one example embodiment and those of skill in the art will understand that various steps of the high-level flow diagram may be combined and/or added without deviating from the scope and the purview of the embodiment.

At 205, content server 105 selects first encoding parameters for a first set of video streams for the media program (e.g., a movie, a TV show, etc.). Content server 105 selects the first encoding parameters based on a first current bandwidth capacity for network 115 linking content server 105 and media device 120, and based on a first current window size of receive buffer 120d of media device 120. Content sever 105 may select the first encoding parameters to optimally use the first current bandwidth capacity and the first current window size for transmitting the set of video streams to media device 120.

At 210, content server 105 begins transmitting the first set of video streams to media device 120 across network 115. The set of video stream may be transmitted from content server 105 to media device 120 based on requests for the video streams transmitted from media device 120 to content server 105 where the requests may include identifiers (e.g., URIs) included in playlist file 140 for the set of video streams. The current bandwidth capacity of network 115 may change based on a variety of conditions, such as changing network traffic. The first current window size of receive buffer 120d may also change based on a variety of conditions, such as media device 120 performing other operations.

At 215, content server 105 selects second encoding parameters for a second set of video streams for the media program. Content server 105 may select the second encoding parameters based on a second current bandwidth capacity, which may be changed from the first current bandwidth capacity. Content server 105 may select the second encoding parameters based the second current window size being different from the first current window size. Content server 105 may determine that the first current bandwidth capacity changes to the second current bandwidth capacity based on changes in round trip times for transmission or via information collected by content server 105. Content server 105 may determine that the first current window size has changed to a second current window size from transmissions issued from media device 105 to content server 105.

At 220, content server 105 begins transmitting the second set of video streams from to media device 120. The quality of the media program consumed by media device 120 may increase and decrease with the different sets of video streams transmitted to media device 120. However, because the sets of video streams are selected based on current bandwidth capacity of network 115, and the current window size of receive buffer 120d, the video streams may be optimized for the current conditions, and the sets of video streams may be transmitted with little or no network packets being dropped and with little or no interruption of consumption of the sets of video streams by media device 120.

According to one embodiment, content server 105 receives the first current window size and the second window size in transmissions transmitted from media device 120. The transmissions may be initial transmissions to establish a transmission session, acknowledgments for received transmissions, etc. Media device 120 may include information for current window size in each transmission that media device 120 sends to content server 105.

According to one embodiment, content server 105 compares the first current bandwidth capacity and the second current bandwidth capacity to determine whether the first current bandwidth capacity and the second current bandwidth capacity are different. If the first current bandwidth capacity and the second current bandwidth capacity are different, then content server 105 may select the second encoding parameters for the second set of video streams for transmitting the second set of video streams to media device 120. Similarly, content server 105 may compare the first and the second current window sizes to determine whether the first and the second current window sizes are different. If the first and the second current window sizes are different, then content server 105 may select the second encoding parameters for the second set of video streams for transmitting the second set of video stream to media device 120. Content server 105 may generate and transmit the second playlist file 140 for the second set of video streams if the first and the second current bandwidth capacities are different and/or if the first and the second current window sizes are different. Encoding parameters for the second set of video streams may be based on the second current bandwidth capacity and/or the second current window size.

Method 200 may be executed a number of times simultaneously by content server 105 for a number of media devices 120. Content server 105 may track current window sizes and current bandwidth capacities for the number of media devices 120, and may change the set of video streams transmitted to each media device 120 in the number of media devices independently based on the current window size and the current bandwidth capacity for each media device 120. That is, content server 105 may chose encoding parameters independently for the sets of video streams to independently optimize the transmissions of the sets of video streams. According to an alternative embodiment, method 200 and other embodiments described herein are executed in whole or in part by a proxy server that is a server gateway between content server 105 and media device 120.

Figure 3:
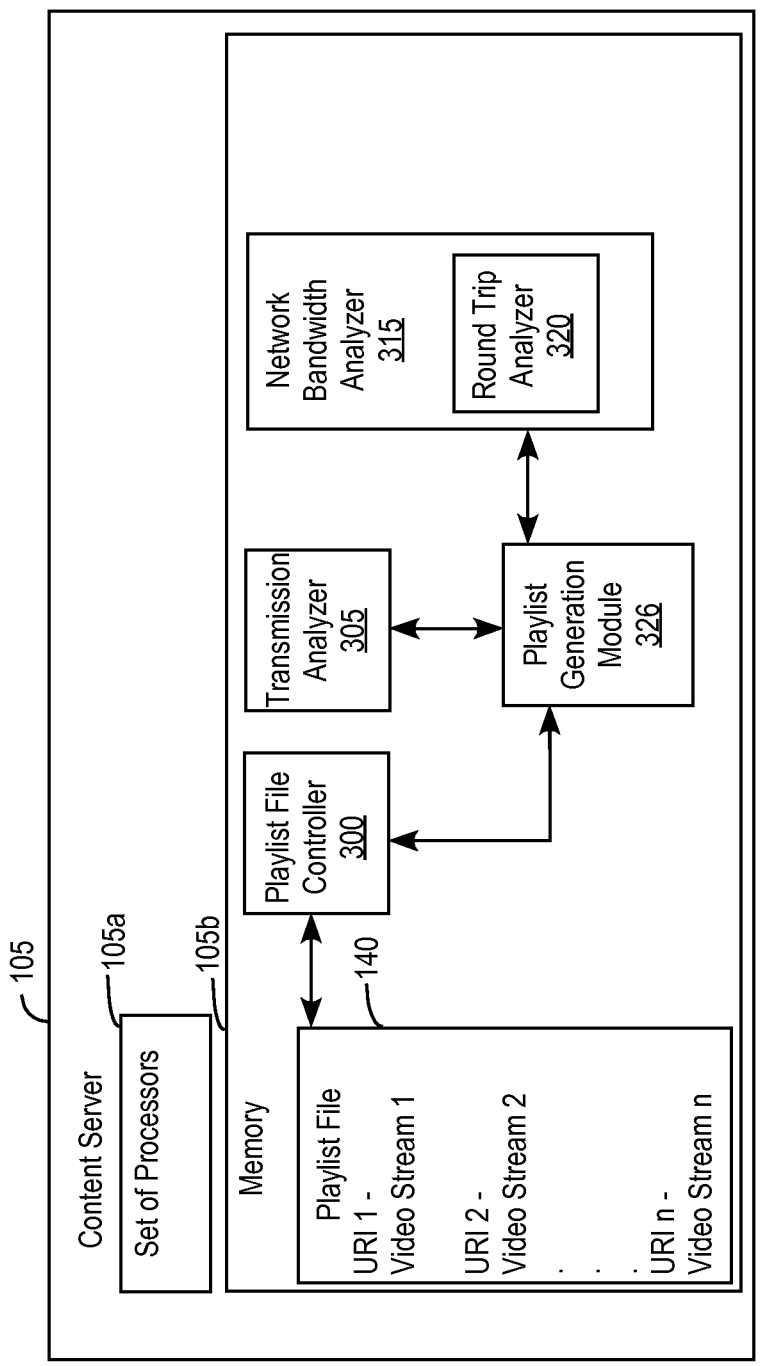
FIG. 3 depicts software elements of a content server according to one embodiment.

FIG. 3 depicts software elements of content server 105. Content server 105 may include a playlist file controller 300 for storing playlist files 140 in memory 105b and for reading playlist 140 files from memory 105b. Content server 105 may include a transmission analyzer 305 for extracting information for current window size from transmissions received by content server 105 from media device 120. Content server 105 may also include a network bandwidth analyzer 315 that estimates the current bandwidth capacity between content server 105 and media device 120. Network bandwidth analyzer 315 may include a round trip analyzer 320 that determines round trip times of sets of transmissions transmitted between content server 105 and media device 120. Network bandwidth analyzer 315 may determine current bandwidth capacity of network links of network 115 linking content server 105 and media device 120 based on the round trip times generated by round trip analyzer 320.

Transmission analyzer 305 may provide the current window size to a playlist generation module 325, and network bandwidth analyzer 315 may provide the current bandwidth capacity to playlist generation module 325. Playlist generation module 325 may use the current window size and the current bandwidth capacity to determine a set of video streams to transmit to media device 120 where the set of video streams has a set of encoding parameters for the current bandwidth capacity and the current window size of receive buffer 120d. Playlist generation module 325 may also generate playlist file 140 for the set of video streams, which is stored in memory by playlist file controller 300.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations, and equivalents may be employed without departing from the scope of the invention as defined by the claims.

What is claimed is:

1. A method for transmitting video streams for a media program from a server to a media device, the method comprising:
    determining, by the server, a current bandwidth capacity for a network linking the server and the media device and a current window size of a receive buffer of the media device, the receive buffer comprising a first section, a second section, and a third section and the current window size is a size of the second section and the third section, the second section comprising video packets received from the server but not yet consumed for media play, and the third section available for receipt of video packets from the server;
    selecting, by the server, a first set of video streams for the media program, the first set of video streams encoded with first encoding parameters and selected based on the determined current bandwidth capacity and the current window size of the receive buffer;
    transmitting the first set of video streams from the server to the media device;
    determining, by the server during transmission of the first set of video streams, a change of the current window size of the receive buffer;
    responsive to determining the change of the current window size, selecting, by the server, a second set of video streams for the media program, the second set of video streams encoded with second encoding parameters and selected based on the change of the current window size; and
    transmitting the second set of video streams from the server to the media device.

2. The method of claim 1, further comprising:
    receiving by the server a first transmission from the media device, wherein the first transmission includes first information indicating the current window size;
    receiving by the server a second transmission from the media device, wherein the second transmission includes second information indicating updated current window size; and
    determining, by the server, the change of the current window size based on the second transmission.

3. The method of claim 1, wherein determining the current bandwidth capacity comprises estimating the current bandwidth capacity based on a round trip time of a server transmission sent from the server to the media device and a media device transmission received by the server from the media device, wherein the media device transmission is transmitted in response to the server transmission.

4. The method of claim 1, further comprising:
responsive to selecting the first set of video streams, generating, by the server, a first playlist file that includes identifiers for retrieving the first set of video streams, wherein the first playlist file does not include identifiers for other sets of video streams, which have other encoding parameters;
transmitting, from the server, the first playlist file to the media device; and
receiving, at the server, requests for the first set of video streams from the media device.

5. The method of claim 1, further comprising:
responsive to selecting the second set of video streams, generating, by the server, a second playlist file that includes identifiers for retrieving the second set of video streams, wherein the second playlist file does not include identifiers for other sets of video streams, which have other encoding parameters;
transmitting, from the server, the second playlist file to the media device; and
receiving, at the server, requests for the second set of video streams from the media device.

6. The method of claim 1, wherein the second set of video streams are transmitted instead of the first set of video streams based on the determined change of the current window size.

7. The method of claim 1, wherein temporal lengths of the second set of video streams are different from temporal lengths of the first set of video streams.

8. A non-transitory computer-readable storage medium comprising instructions for controlling a server for transmitting a set of video streams to a media device, the instructions, when executed, for controlling the server to be configured for:
determining a current bandwidth capacity for a network linking the server and the media device and a current window size of a receive buffer of the media device, the receive buffer comprising a first section, a second section, and a third section and the current window size is a size of the second section and the third section, the second section comprising video packets received from the server but not yet consumed for media play, and the third section available for receipt of video packets from the server;
selecting a first set of video streams for the media program, the first set of video streams encoded with first encoding parameters and selected based on the determined current bandwidth capacity and the current window size of the receive buffer;
transmitting the first set of video streams from the server to the media device;
determining, during transmission of the first set of video streams, a change of the current window size of the receive buffer;
responsive to determining the change of the current window size, selecting a second set of video streams for the media program, the second set of video streams having second encoding parameters and selected based on the change of the current window size; and
transmitting the second set of video streams from the server to the media device.

9. The non-transitory computer-readable storage medium of claim 8, wherein the instructions are for further controlling the server to be configured for:
receiving a first transmission from the media device, wherein the first transmission includes first information indicating the current window size;
receiving by the server a second transmission from the media device, wherein the second transmission includes second information indicating updated current window size; and
determining the change of the current window size based on the second transmission.

10. The non-transitory computer-readable storage medium of claim 8, wherein the instructions are for further controlling the server to be configured for estimating the current bandwidth capacity based on a round trip time of a server transmission sent from the server to the media device, and a media device transmission received by the server from the media device, wherein the media device transmission is transmitted in response to the server transmission.

11. The non-transitory computer-readable storage medium of claim 8, wherein the instructions are for further controlling the server to be configured for:
responsive to selecting the first set of video streams, generating a first playlist file that includes identifiers for retrieving the first set of video streams, wherein the first playlist file does not include identifiers for other sets of video streams, which have other encoding parameters;
transmitting the first playlist file to the media device; and
receiving requests for the first set of video streams from the media device.

12. The non-transitory computer-readable storage medium of claim 8, wherein the instructions are for further controlling the server to be configured for:
responsive to selecting the second set of video streams, generating a second playlist file that includes identifiers for retrieving the second set of video streams, wherein the second playlist file does not include identifiers for other sets of video streams, which have other encoding parameters;
transmitting the second playlist file to the media device; and
receiving requests for the second set of video streams from the media device.

13. A server for transmitting a set of video streams to a media device comprising:
a set of processors; and
a computer-readable storage medium comprises instructions for controlling the set of processors to be configured for:
determining a current bandwidth capacity for a network linking the server and the media device and a current window size of a receive buffer of the media device, the receive buffer comprising a first section, a second section, and a third section and the current window size is a size of the second section and the third section, the second section comprising video packets received from the server but not yet consumed for media play, and the third section available for receipt of video packets from the server;
selecting a first set of video streams for the media program, the first set of video streams having first encoding parameters and selected based on the determined current bandwidth capacity and the current window size of the receive buffer;
transmitting the first set of video streams from the server to the media device;

determining, during transmission of the first set of video streams, a change of the current window size of the receive buffer;

responsive to determining the change of the current window size, selecting a second set of video streams for the media program, the second set of video streams having second encoding parameters and selected based on the change of the current window size; and transmitting the second set of video streams from the server to the media device.

14. The server of claim 13, wherein the computer-readable storage medium further comprises instructions for controlling the set of processors to be configured for:

receiving a first transmission from the media device, wherein the first transmission includes first information indicating the current window size;

receiving a second transmission from the media device, wherein the second transmission includes second information indicating updated current window size; and determining the change of the current window size based on the second transmission.

15. The server of claim 13, wherein the computer-readable storage medium further comprises instructions for controlling the set of processors to be configured for estimating the current bandwidth capacity based on a round trip time of a server transmission sent from the server to the media device, and a media device transmission received by the server from the media device, wherein the media device transmission is transmitted in response to the server transmission.

16. A method for transmitting video streams for a media program from a server to a media device, the method comprising:

determining, by the server, a current bandwidth capacity for a network linking the server and the media device and a current window size of a receive buffer of the media device, the receive buffer comprising a first section, a second section, and a third section and the current window size is a size of the second section and the third section, the second section comprising video packets received from the server but not yet consumed for media play, and the third section available for receipt of video packets from the server;

selecting, by the server, a first set of video streams for the media program, the first set of video streams having first encoding parameters and selected based on the determined current bandwidth capacity and the current window size of the receive buffer;

transmitting the first set of video streams from the server to the media device;

determining, by the server during transmission of the first set of video streams, a change of the current bandwidth capacity;

responsive to determining the change of the current bandwidth capacity, selecting, by the server, a second set of video streams for the media program, the second set of video streams having second encoding parameters and selected based on the change of the current window size; and transmitting the second set of video streams from the server to the media device.

17. The method of claim 16, further comprising estimating by the server the current bandwidth capacity based on a round trip time of a server transmission sent from the server to the media device and a media device transmission received by the server from the media device, wherein the media device transmission is transmitted in response to the server transmission.

* * * * *